United States Patent
Wamprecht et al.

(10) Patent No.: US 7,659,341 B2
(45) Date of Patent: Feb. 9, 2010

(54) AQUEOUS COMPOSITIONS FOR CAN COATING

(75) Inventors: Christian Wamprecht, Neuss (DE); Beate Baumbach, Burscheid (DE); Wolfram Küttner, Bergisch Gladbach (DE)

(73) Assignee: Bayer MaterialScience AG, Leverkusen (DE)

( * ) Notice: Subject to any disclaimer, the term of this patent is extended or adjusted under 35 U.S.C. 154(b) by 73 days.

(21) Appl. No.: 10/953,164

(22) Filed: Sep. 29, 2004

(65) Prior Publication Data

US 2005/0075451 A1    Apr. 7, 2005

(30) Foreign Application Priority Data

Oct. 2, 2003    (DE) ................ 103 45 788

(51) Int. Cl.
*C08L 67/00*    (2006.01)
(52) U.S. Cl. ................................... 524/601
(58) Field of Classification Search ............... 525/601; 524/601
See application file for complete search history.

(56) References Cited

U.S. PATENT DOCUMENTS

| | | | | |
|---|---|---|---|---|
| 4,018,848 | A |   | 4/1977 | Khanna ................ 260/834 |
| 4,997,865 | A |   | 3/1991 | Scherping et al. ......... 523/409 |
| 5,030,683 | A | * | 7/1991 | Nakamura .............. 524/512 |
| 5,114,993 | A |   | 5/1992 | Scherping et al. ......... 523/409 |
| 5,349,041 | A | * | 9/1994 | Blum et al. .............. 528/85 |
| 5,412,049 | A | * | 5/1995 | Argyropoulos et al. ..... 526/312 |
| 2002/0061959 | A1 |   | 5/2002 | Kajimaru et al. |
| 2002/0090462 | A1 | * | 7/2002 | Obie ................. 427/415 |

FOREIGN PATENT DOCUMENTS

| | | |
|---|---|---|
| DE | 199 12 794 | 9/2000 |
| EP | 0 062 786 | 10/1982 |
| EP | 0523940 A2 | 1/1993 |
| EP | 1 277 814 A1 | 1/2003 |
| JP | 06-157984 | 6/1994 |
| JP | 07-011188 | 1/1995 |
| WO | 9846689 A1 | 10/1998 |

OTHER PUBLICATIONS

Popular Plastics & Packaging, Aug. 2001, pp. 66-70, K.R. Kumar, "Internal lacquers of metallic food containers".
Ullmanns Encyclopädie der technischen Chemie, 4$^{th}$ edition, vol. 29, (month unavailable) 1980, pp. 61-88, Dr. John Rüter, Dr. Klaus König and Dr. Karl Heinz Seemann, "Polyester".
Lackkunstharze, Carl Hanser Verlag, Munich (month unavailable) 1971, pp. 86-152, H. Wagner and H.F. Sarx,"Polyesterharze".

* cited by examiner

*Primary Examiner*—Randy Gulakowski
*Assistant Examiner*—Alicia M Toscano
(74) *Attorney, Agent, or Firm*—Robert S. Klemz; Noland J. Cheung

(57) ABSTRACT

An aqueous coating composition containing
A) one or more water-dilutable polyester polyols having an OH number of from 20 to 300 mg KOH/g and an acid number of from 20 to 80 mg KOH/g, obtained by reacting
 a) 49 to 40 mol % of a carboxylic acid component containing
  a1) one or more aliphatic, cycloaliphatic, araliphatic and/or aromatic carboxylic acids with a COOH functionality $\geq 2$ and
  a2) optionally, aromatic, cycloaliphatic and/or aliphatic monocarboxylic acids
 with
 b) 51 to 60 mol % of an alcohol component containing
  b1) one or more aliphatic, cycloaliphatic and/or araliphatic polyols with Mn of from 62 to 272 g/mol and an average OH functionality $\geq 2$ and
  b2) optionally, aliphatic, cycloaliphatic and/or araliphatic monoalcohols,
B) one or more OH-reactive crosslinkers
C) water,
D) neutralizing agents and
E) optionally solvents, auxiliaries and additives.

The aqueous coating compositions can be used for coating metal substrates, such as cans.

18 Claims, No Drawings

AQUEOUS COMPOSITIONS FOR CAN COATING

CROSS REFERENCE TO RELATED PATENT APPLICATION

The present patent application claims the right of priority under 35 U.S.C. § 119 (a)-(d) of German Patent Application No. 103 46 788.7, filed Oct. 3, 2003.

BACKGROUND OF THE INVENTION

1. Field of the Invention

The present invention relates to new aqueous coating compositions for coating metal substrates, such as cans, which satisfy in particular the requirements from the food sector and to a process for preparing them.

2. Description of the Prior Art

For producing containers, such as cans, for use as packaging material, particularly for the packaging of foods, including beverages, sheets of tinplate, chromated steel and aluminium in panel or strip form typically are coated. This coating prevents contact between contents and metal, so that corrosion of the metal or any effect of the metal on product quality is ruled out. Nor of course must the lacquer film itself—as a result of lacquer constituents which have leached out, for example—result in any influencing or adverse effect on the contents. Coating materials and coatings for cans are therefore subject to very exacting requirements in respect of flexibility, solvent resistance and chemical resistance, and toxic constituents.

Typically the so-called gold lacquers based on high molecular mass epoxy resins and phenolic resins of the resole type, which are partly etherified or otherwise plasticized, are used as interior protective lacquers for metal packaging. It is possible in this case to apply two or more lacquer films, including films based on different resins. This is necessary, for example, if the requirement is for particularly high-grade corrosion protection in conjunction with a critical metal deformation and/or a particularly long filled-can storage time.

Likewise employed are epoxy-amine resin lacquers, although such lacquers are more sensitive towards adverse metal surfaces and also have a lower resistance to acidic contents.

Lacquers based on vinyl chloride copolymers, for which points of note include in particular absence of flavour and a low pore count, have uses which include the interior protection of beverage cans. PVC organosols as well are employed, particularly for tear-open lids made of aluminium and from tinplate, noteworthy features here being the high achievable solids content and the good film elasticity, even when the layer is applied in a relatively thick film.

The prior art, described in "Internal Lacquers of metallic food containers", K. R: Kumar, in Popular Plastics & Packaging, August 2001, pages 66-70, includes the use of coating compositions based on epoxy resins and phenolic resin hardeners.

WO 88/01287 and U.S. Pat. No. 4,018,848 also disclose coating compositions based on epoxy resins and phenolic resin hardeners for coating metal strips for producing metal cans for foods. These coatings are distinguished by a particularly good resistance to aggressive products, good mechanical properties, such as high elasticity, and very good metal adhesion. Nevertheless virtually all of these coating compositions comprise organic solvents, examples being aromatics mixtures such as Solvesso® 100, 150 or 200. The epoxy resins used virtually all include 2,2'-bis(4-hydroxyphenyl) propane bis(2,3-epoxypropyl) ether (or homologues thereof), which is also known as bisphenol A diglycidyl ether or "BADGE" (Bisphenol A Di-Glycidyl Ether).

Bisphenol A (BPA), the precursor of "BADGE", is known on account of its effect on the endocrine system. It is also known that "BADGE" is mutagenic in in vitro tests and that small amounts of this substance may enter the packaged foodstuffs. Additionally "BADGE" is suspected of being carcinogenic. It is therefore advantageous to use BADGE-free coating compositions for the interior coating of cans with foodstuff contact.

"BADGE"-free coatings are described for example in DE-A 199 12 794 and EP-A 1 277 814. These coatings, however, are based on solvent-borne coating compositions with a considerable solvent fraction (up to 90% by weight), which on emission grounds are nowadays unwanted. Furthermore, residues of solvent in the coatings may migrate and thus adversely affect the contents.

Aqueous coating compositions for can coating applications are known, but they contain either blocked polyisocyanate crosslinkers or binders synthesized from components which do not comply with § 175300 of the USA Code of Federal Regulations No. 21, FDA (Food and Drug Administration).

In the course of the baking operation, blocked polyisocyanates give off the corresponding blocking agent, e.g. butanone oxime or ε-caprolactam. These elimination products may, however, remain partly in the lacquer film and hence migrate into the subsequent contents. Such systems have therefore hitherto been unsuitable for use in the food sector.

It was an object of the present invention, therefore, to provide "BADGE"-free aqueous coating compositions which are FDA-compliant in accordance with Paragraph 175300, USA Code of Federal Regulations No. 21, contain not more than 20% by weight of organic solvents and possess as a crosslinked film very good mechanical properties, such as high elasticity; a high level of resistance to solvents, chemicals and fatty and oily substances, and which at the same time exhibit high resistance under thermal stress.

FDA-compliant in this context means that the components present in the binder compositions or used in their preparation are exclusively those listed in § 175300 in the USA Code of Federal Regulations No. 21 (FDA).

SUMMARY OF THE INVENTION

The present invention is directed to aqueous coating compositions containing

A) one or more water-dilutable polyester polyols having an OH number of from 20 to 300 mg KOH/g and an acid number of from 20 to 80 mg KOH/g, obtained by reacting
   a) 49 to 40 mol % of a carboxylic acid component containing
      a1) one or more aliphatic, cycloaliphatic, araliphatic and/or aromatic carboxylic acids with a COOH functionality $\geq 2$ or anhydrides thereof and
      a2) optionally, aromatic, cycloaliphatic and/or aliphatic monocarboxylic acids
   with
   b) 51 to 60 mol % of an alcohol component containing
      b1) one or more aliphatic, cycloaliphatic and/or araliphatic polyols with a number-average molecular weight of from 62 to 272 g/mol and an average OH functionality $\geq 2$ and b2) optionally, aliphatic, cycloaliphatic and/or araliphatic mono alcohols, B) one or more OH-reactive crosslinkers selected from the group consisting of phenolic resins, amino resins, benzoguanidine resins and urea resins each having a functionality (based on OH-reactive groups) of $\geq 2$, C) water, D) neutralizing agents and E) optionally solvents, auxiliaries and additives.

The present invention is also directed to an aqueous coating composition containing the composition described above and one or more components selected from defoamers, thickeners, flow-control agents, pigments, fillers, emulsifiers, dispersing assistants, light stabilizers, solvents and combinations thereof.

The present invention is further directed to coatings obtained from the above-described aqueous coating compositions as well as substrates coated thereby and in a particular embodiment to metal cans coated with the present coatings.

DETAILED DESCRIPTION OF THE INVENTION

Other than in the operating examples, or where otherwise indicated, all numbers or expressions referring to quantities of ingredients, reaction conditions, etc. used in the specification and claims are to be understood as modified in all instances by the term "about."

The underlying object of the invention has been achieved by means of the coating compositions described below.

The invention accordingly provides aqueous coating compositions comprising

A) one or more water-dilutable polyester polyols having an OH number of from 20 to 300 mg KOH/g and an acid number of from 20 to 80 mg KOH/g, obtainable by reacting
  a) 49 to 40 mol % of a carboxylic acid component comprising
    a1) one or more aliphatic, cycloaliphatic, araliphatic and/or aromatic carboxylic acids with a COOH functionality $\geq 2$ or anhydrides thereof and
    a2) if desired, aromatic, cycloaliphatic and/or aliphatic monocarboxylic acids
  with
  b) 51 to 60 mol % of an alcohol component comprising
    b1) one or more aliphatic, cycloaliphatic and/or araliphatic polyols with a number-average molecular weight of from 62 to 272 g/mol and an average OH functionality $\geq 2$ and
    b2) if desired, aliphatic, cycloaliphatic and/or araliphatic monoalcohols, B) one or more OH-reactive crosslinkers selected from the group consisting of phenolic resins, amino resins, benzoguanidine resins and/or urea resins each having a functionality (based on OH-reactive groups) of $\geq 2$, C) water D) neutralizing agents and E) optionally solvents, auxiliaries and additives, and also a process for preparing them by mixing the individual components A)-E) with one another, where first of all A), optionally in the presence of C), is fully or partly neutralized with D) before components B), E) and remaining amounts of C) and D) are added.

In component a1) the aromatic dicarboxylic and polycarboxylic acid or anhydrides used comprise preferably phthalic acid, isophthalic acid, terephthalic acid, trimellitic acid, phthalic anhydride, trimellitic anhydride and/or pyromellitic anhydride, more preferably phthalic anhydride, terephthalic acid and/or isophthalic acid, very preferably phthalic anhydride and/or terephthalic acid.

Aliphatic dicarboxylic or polycarboxylic acids used in a1) are preferably succinic acid, maleic acid, adipic acid, sebacic acid, dodecanedioic acid, dimerized fatty acids, succinic anhydride and/or maleic anhydride, more preferably succinic anhydride, maleic anhydride and/or adipic acid, very preferably adipic acid and/or maleic anhydride.

Cycloaliphatic dicarboxylic or polycarboxylic acids used in a1) are preferably 1,4-cyclohexanedicarboxylic acid, hexahydrophthalic acid and/or hexahydrophthalic anhydride, more preferably 1,4-cyclohexanedicarboxylic acid and/or hexahydrophthalic anhydride, very preferably 1,4-cyclohexanedicarboxylic acid.

Monocarboxylic acids used in component a2) are preferably acetic acid, propionic acid, 1-octanoic acid, 1-decanoic acid, 1-dodecanoic acid, 1-octadecanoic acid, saturated and unsaturated fatty acids and/or benzoic acid, more preferably 1-dodecanoic acid, 1-octadecanoic acid, saturated and unsaturated fatty acids and/or benzoic acid, very preferably saturated and unsaturated fatty acids and/or benzoic acid.

Aliphatic polyols used in component b1) are preferably ethylene glycol, diethylene glycol, triethylene glycol, 1,2-propanediol, 1,4-butanediol, neopentyl glycol, 1,6-hexanediol, glycerol, trimethylolpropane, pentaerythritol and/or sorbitol, more preferably ethylene glycol, diethylene glycol, 1,2-propanediol, 1,6-hexanediol, glycerol and/or trimethylolpropane, very preferably ethylene glycol, diethylene glycol, 1,2-propanediol and/or trimethylolpropane.

Monoalcohols used in component b2) are preferably methanol, ethanol, 1-propanol, 1-butanol, 2-butanol, isobutanol, 1-pentanol, 1-hexanol, 2-ethylhexanol, 1-octanol, 1-decanol, 1-dodecanol, butyl glycol, and/or butyl diglycol, more preferably 2-ethylhexanol, 1-decanol, 1-dodecanol, cyclohexanol, butyl glycol and/or butyl diglycol, very preferably 2-ethylhexanol, cyclohexanol, but glycol and/or butyl diglycol.

The stated compounds of components a1), a2), b1) and b2) can in each case be used individually or in any desired mixtures with one another in the respective components.

The polyester polyols of component A1) that are essential to the invention are prepared in conventional manner by methods as described at length in, for example, "Ullmanns Encyclopädie der Technischen Chemie", Verlag Chemie Weinheim, 4th edition (1980) volume 19, pages 61 ff. or by H. Wagner and H. F. Sarx in "Lackkunstharze", Carl Hanser Verlag, Munich (1971), pages 86 to 152.

The preparation is carried out preferably in the melt, in the presence if desired of a catalytic amount of a customary esterification catalyst, such as acids, bases or transition metal compounds, such as titanium tetrabutoxide, dibutyltin oxide or butylstannic acid, at temperatures from 80 to 270° C., preferably from 100 to 250° C., under a nitrogen atmosphere. One of the functions of the stream of nitrogen is to remove the water of reaction formed. Alternatively the water of reaction can be removed by applying a vacuum of preferably up to 0.1 mbar. If desired it is also possible to add an azeotrope former, such as xylolene, to discharge the water of reaction. The esterification reaction is continued until the target values for the hydroxyl number and acid number and for the viscosity have been reached. In one preferred embodiment of the invention first an OH-functional polyester polyol is prepared which contains only small amounts, if any, of free carboxylic acid and/or carboxylate functions and which then in a subsequent step is reacted with a cyclic dicarboxylic anhydride, such as phthalic anhydride, in a ring-opening and monoester-forming reaction, with free carboxylic acid and/or carboxylate groups then being formed.

The weight-average molecular weights $M_w$ of the water-dilutable polyester polyols of component A) that are essential to the invention are >3000 g/mol, preferably >7500 g/mol, more preferably >10 000 g/mol and very preferably between 10 000 and 30 000 g/mol, particularly 10 000 and 30 000 g/mol.

The OH numbers of the water-dilutable polyester polyols A) that are essential to the invention are in the range from 20 to 300 mg KOH/g, preferably from 25 to 200 mg KOH/g, more preferably from 30 to 150 mg KOH/g and very preferably from 35 to 100 mg KOH/g, based on resin solids.

The acid numbers of the water-dilutable polyester polyols A) are in the range from 20 to 80 mg KOH/g, preferably from 25 to 75 mg KOH/g, more preferably from 30 to 70 mg KOH/g and very preferably from 40 to 60 mg KOH/g, based on resin solids.

Preferred compounds of component B) are the phenolic resins, Uravar SFC 112® (unplasticized phenolic resin from DSM Coatings Resin, Zwolle, NL), Uravar FB 209 57 BT® (butylated phenolic resin from DSM Coatings Resin, Zwolle, NL), Uravar FB 190® or SFC 138® (etherified phenolic resins from DSM Coatings Resin, Zwolle, NL) and Bakelite 9610 LW® (modified resole phenolic resin from Bakelite AG, Iserlohn, DE).

Preferred compounds of component B) are the melamine resins, Cymel® 303 (Cytec Netherlands, Botlek, NL) and Maprenal® MF 900 (UCB Surface Specialties, Brussels, BE).

Preferred compounds of component B) are the benzoguanidine resins, Cymel® 1123 (Cytec Netherlands, Botlek, NL) and Maprenal® MF 980 (UCB Surface Specialties, Brussels, BE).

Preferred compounds of component B) are the urea resins, UFR® 80 (Cytec Netherlands, Botlek, NL) and Viamin® (UCB Surface Specialties, Brussels, BE).

Particular preference is given to the sole use of melamine resins as crosslinker component B), very particular preference to those of the type referred to above.

Suitable neutralizing agents of component D) for neutralizing the carboxylic acid groups of the polyester polyols from A) are not only inorganic but also organic bases. Preference is given to using primary, secondary and tertiary amines and ammonia, particular preference to using tertiary amines, such as triethylamine, tributylamine, N-methyldiethanolamine, N,N-dimethylethanolamine, N,N-diethylethanolamine, triethanolamine, triisopropylamine and triisopropanolamine. Very particular preference is given to N,N-dimethylethanolamine, triethanolamine and triethylamine.

Constituents of component E) are for example defoamers, thickeners, flow-control agents, pigments, fillers, emulsifiers, dispersing assistants, light stabilizers and also solvents.

The desired processing viscosity is generally brought about by adding organic solvents or water, preferably water.

In order to bring about very specific processing viscosities or to achieve particular Theological properties it is also possible to use thickening agent or combinations of different thickening agents, e.g. ionic and associative thickeners.

In order to make the polyesters of component A) water-dilutable it is necessary for the carboxylic acid groups present to be fully or partly neutralized with a neutralizing agent. The neutralizing agent D) can be added before, during or after the ester of the invention is transferred to the aqueous phase, preference being given to neutralization prior to transfer to the aqueous phase.

The amount of component D) used for this purpose is normally from 0.4 to 1.5 mol, preferably from 0.5 to 1.4 mol and with particular preference from 0.6 to 1.3 mol, based on all of the COOH functions present arithmetically in A).

In order to transfer the polyester polyols of component A) to the aqueous phase either they are introduced into the dispersing water C) with strong shearing if desired, such as vigorous stirring, or conversely the dispersing water C) is stirred into the polyester polyol(s). It is often advantageous here to add water-dilutable organic solvents of component E) to the polyester polyol prior to the dispersing operation, these solvents acting, so to speak, as auxiliary solvents or cosolvents. Examples of such solvents include butyl glycol and butyl diglycol.

The quantitative ratio of components A) and B) is normally between 99:1 to 50:50% by weight, preferably between 99:1 to 65:35% by weight and very preferably between 99:1 to 80:20% by weight, based on as-supplied forms.

In the process of the invention, preferably, first component A) comprising water-dilutable polyester polyols is neutralized with component D) and then the resulting mixture is mixed with water C), with strong shearing where appropriate, and an aqueous polyester dispersion or solution is obtained. Subsequently the crosslinker component B) and optionally solvents and auxiliaries and additives of component E) are incorporated by stirring or emulsification.

The invention further provides coatings and coated substrates produced using the coating compositions of the invention.

Preferred substrates for coating with the coating compositions of the invention are metals such as are commonly used for producing containers, vessels and cans for food contact.

Substrate coating with the coating compositions of the invention takes place preferably by the coil coating process.

The coatings are generally dried and cured under baking conditions up to 270° C., preferably up to 240° C. and more preferably up to 200° C.

The substrate coatings obtained in this way feature particularly good metal adhesion, high hardness and at the same time particularly good elasticity, which at face value are divergent properties. Additionally the coatings possess very high resistance to solvents, chemicals and water and exhibit sterilization resistance, effective levelling and a high gloss. They are free from "BADGE" and are extremely suitable as a coating for cans with food contact.

EXAMPLES

In the examples below all percentages are by weight.

Parameters determined were the solids content (thick-layer method: lid, 1 g sample, 1 h 125° C., convection oven, based on DIN EN ISO 3251), the acid number (mg KOH/g sample, titration with 0.1 mol/l NaOH solution, based on DIN 53402), the viscosity (rotational viscosimeter VT 550 from Haake GmbH, Karlsruhe, DE, MV-DIN cup for viscosity <10 000 mPas/23° C.), the OH number (mg KOH/g sample, acetylation, hydrolysis, titration with 0.1 mol/l NaOH, based on DIN 53240) and the Hazen colour number (Hazen colour number to DIN 53995, colour number measuring instrument Lico® 400, Dr. Lange GmbH, Berlin, DE). The acid number and OH number are stated both for the as-supplied form (asf) and for the solid resin (SR). The OH content can be calculated from the OH number by dividing by 33.

Additives and binders used were as follows:

Byk 301®: flow-control agent, 52% in 2-butoxyethanol, Byk Chemie, Wesel, DE.

Cymel 303®: melamine resin crosslinker, solvent-free, Cytec Netherlands, Botlek, NL.

Epikote® 1007: epoxy resin, solvent-free, Resolution Performance Products, 3190 AN Hoogvliet Rt, NL.

SFC 112®, non-etherified phenolic resin, 72% in 1-butanol, DSM Coating Resins, Zwolle, NL.

Uravar FB 209® BT-57: butylated phenolic resin 57% in 1-butanol/toluene 4:1, DSM Coating Resins, Zwolle, NL.

Additol XK 406®: phenolic resin, 8% in petroleum/xylolene/1-butanol/phosphoric acid/water 16.5:12.5:12:4:1, UCB Surface Specialties, Brussels, BE.

Example 1

Preparation of a Water-Dilutable Polyester Polyol A1)

4418 g of diethylene glycol and 1596 g of trimethylolpropane were weighed out together into a 15 liter reactor equipped with stirrer, heating, automatic temperature control, nitrogen inlet, column, water separator and receiver and were heated to 120° C. with stirring, during which nitrogen was passed through the reactor. Then 682 g of adipic acid, 2717 g of terephthalic acid and 3806 g of phthalic anhydride were added and the mixture was heated to 230° C. at a rate such that the column overhead temperature did not exceed 103° C. During this heating the water of reaction was separated off. Condensation was continued to a resin viscosity of 85 to 90 seconds (efflux time from a DIN 4 mm cup at 23° C., as a 55% solution in methoxypropyl acetate). The reaction mixture was then cooled to 140° C. Up to this point of the reaction 1428 g of resin were taken for samples. 1428 g of phthalic anhydride were added to the remaining contents of the vessel and the mixture was stirred at 140° C. until a resin viscosity of 88 to 92 seconds (efflux time from a DIN 4 mm cup at 23° C., as a 50% solution in methoxypropyl acetate) was reached. Thereafter a total of 2550 g of resin (including the withdrawn samples) were taken, then 4050 g of butyl glycol were added and dissolved in with stirring at 100° C. for 2 hours. Subsequently the solution was cooled to 60° C. and the contents of the vessel were filtered. This gave a solution having a solids content of 70.4% by weight, an acid number of 37 mg KOH/g, an OH number of 47 mg KOH/g (based on resin solids), a Hazen colour number of 43 APHA and a viscosity of 12 516 mPa·s at 23° C.

Example 2

Preparation of a Water-Dilutable Polyester Polyol A2)

4023 g of diethylene glycol and 1453 g of trimethylolpropane were weighed out together into a 15 liter reactor equipped with stirrer, heating, automatic temperature control, nitrogen inlet, column, water separator and receiver and were heated to 120° C. with stirring, during which nitrogen was passed through the reactor. Then 3174 g of terephthalic acid and 3458 g of phthalic anhydride were added and the mixture was heated to 230° C. at a rate such that the column overhead temperature did not exceed 103° C. During this heating the water of reaction was separated off. Condensation was continued to an acid number of <5 mg KOH/g. The reaction mixture was then cooled to 140° C. Then a total of 1309 g of resin (including the withdrawn samples) were taken. 1309 g of phthalic anhydride were added to the remaining contents of the vessel and the mixture was stirred at 140° C. until an acid number of 45 to 50 mg KOH/g was reached. Thereafter a total of 1550 g of resin (including the withdrawn samples) were taken, then 4050 g of butyl glycol were added and dissolved in with stirring at 100° C. for 2 hours. Subsequently the solution was cooled to 60° C. and the contents of the vessel were filtered. This gave 13 500 g of a polyester solution having a solids content of 70.2% by weight, an acid number of 33.5 mg KOH/g, an OH number of 75 mg KOH/g (based on resin solids), a Hazen colour number of 50 APHA and a viscosity of 5370 mPa·s.

Example 3

Comparative; New Working of Example II, Page 6 of EP-A 1 277 814

Example II of EP-A 1 277 814 was reworked with the stated raw materials and proportions. Since no esterification temperature is quoted a reaction temperature of 230° C., which is typical for esterifications, was chosen. This gave a yellowish resin having a solids content of 40.7% by weight, an acid number of 0.73 mg KOH/g and a viscosity of 45.000 mPas (23° C.).

Example 4

Lacquers and Technical Tests

The water-dilutable polyesters of examples 1 and 2 were admixed with amounts of N,N-dimethyletanolamine such as to result in a degree of neutralization of 120%. Then water, crosslinkers B) and additives E) were added with vigorous stirring at room temperature (examples 4a and 4b). For comparison a commercially customary coating composition based on an epoxy resin and phenolic resin, as V1, and a coating composition based on the above example 3 in accordance with the formula of experiment II pages 7+8 of EP-A 1 277 814, as V2, were tested.

The individual proportions of the lacquers prepared and tested are set out in table 1 below.

| Components | 4a | 4b | V1 | V2 |
| --- | --- | --- | --- | --- |
| Polyester A1 | 52.84 g | | | |
| Polyester A2 | | 52.84 g | | |
| Polyol from example 3 | | | | 61.50 g |
| Water | 41.65 | 41.65 | | |
| Cymel ® 303 | 3.09 g | 3.09 g | | |
| Byk ® 301 | 0.16 g | 0.16 g | | |
| Formaldehyde/phenolic resin[1] | | | 13.80 g | |
| Epikote ® 1007 | | | 82.90 g | |
| $H_3PO_4$, 10% in 1-butanol | | | 3.30 g | |
| SFC ® 112 | | | | 12.60 g |
| Uravar ® FB 209 | | | | 2.80 g |
| Additol ® XK 406 | | | | 0.30 g |
| DBE Ester (Dibasic ester)[2] | | | | 11.80 g |
| Diluent[3] | | | | 11.00 g |

[1]Resistherm LVP BBB 2036, Bayer AG Leverkusen, DE
[2]INVISTA Germany DuPont Textiles & Interiors GmbH, Bad Homburg v.d.H, DE.
[3]Mixture of 334 parts by weight Dowanol PM (Dow Chemical, Stade, DE), 65 parts by weight butyl acetate, 460 parts by weight Solvesso 150 (Esso AG, Cologne, DE) and 140 parts by weight butyl glycol.

The clear lacquers described above were applied using a commercially customary doctor blade to tinplate sheets T1

(Rasselstein Hoesch, Andernach, DE) and baked in a forced-air oven at 180° C. for 10 minutes. This gave dry film thicknesses of 8-10 μm.

The following technical properties were found:

| Test | 4a | 4b | V1 | V2 |
|---|---|---|---|---|
| Adhesion cross-hatch[a] | 0 | 0 | 0–1 | 0–1 |
| Flexural impact test[b] | 65 | 52 | 27 | 90 |
| Deep draw/circular cup[c] | 0 | 0 | 0 | 0 |
| Stacking resistance[d] | 0 | 0 | 0 | 0 |
| MEK wipe test[e] | 80 | 70 | >100 | 30 |
| Sterilization[f] | 2 | 2 | 0–1 | 2–3 |

[a]Adhesion cross-hatch (to DIN 53151) evaluation: 0 = good, 5 = poor.
[b]Erichsen fold impact tester model 471 (testing machine (Erichsen GmbH & Co KG, Hemer, DE), impact hammer 2300 g, drop height 650 mm, report of the crack length in mm.
[c]Erichsen deep-draw cup testing machine (Erichsen GmbH & Co KG, Hemer, DE), evaluation to DIN 53230.
[d]Pairs of coated plates were stacked with the lacquered sides facing one another. A black ribbon filter was placed between the coated plates. The stack was subsequently loaded with a steel plate, to improve weight distribution, and with a 5 kg weight and stored at 50° C. for 16 h. After storage any damage to the film (such as impression tracks of the filter paper) were inspected; evaluation: 0 = good, 5 = poor.
[e]A cotton pad soaked with methyl ethyl ketone (MEK) was moved back and forth under constant pressure over the lacquer film 100 times (100 double rubs). If severe damage or detachment was observed after less than 100 double rubs, the test was terminated. Subsequently the plates were assessed visually for clouding and/or film detachment.
[f]Cured coatings were treated in a sterilizer (Aesculap JA 154, Aesculap AG, Tuttlingen, DE), at 1.2 bar/121° C. for 2 h, followed by inspection of the coating for loss of adhesion (stripping), loss of gloss, water spots, blistering; evaluation: 0 = good, 5 = poor Discussion of the Results:

With the aqueous lacquers of examples 1 and 2 (examples 4a and 4b) and the conventional lacquer V1 it is possible to produce coatings which have outstanding adhesion, very good deep draw and very good stacking resistance. The solvent resistance, sterilization resistance and elasticity of the conventional lacquer is somewhat better than those of the aqueous lacquers of the invention. In contrast to comparison V1, however, the lacquers of the invention are completely free from residues of bisphenol A diglycidyl ether and have a much lower fraction of organic solvents. The comparison lacquer V2, on the other hand, has a much poorer solvent resistance and elasticity and a high solvent fraction.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. FDA-compliant aqueous coating compositions comprising
   A) one or more water-dilutable polyester polyols having an OH number of from 20 to 300 mg KOH/g and an acid number of from 20 to 80 mg KOH/g, obtained by reacting
      a) 49 to 40 mol % of a carboxylic acid component comprising
      a1) one or more aliphatic, cycloaliphatic, araliphatic and/or aromatic carboxylic acids with a COOH functionality ≧2 or anhydrides thereof and
      a2) if desired, aromatic, cycloaliphatic and/or aliphatic monocarboxylic acids
      with
      b) 51 to 60 mol % of an alcohol component comprising
      b1) one or more aliphatic, cycloaliphatic and/or araliphatic polyols with a number-average molecular weight of from 62 to 272 g/mol and an average OH functionality ≧2 and
      b2) if desired, aliphatic, cycloaliphatic and/or araliphatic monoalcohols,
   B) one or more OH-reactive crosslinkers selected from the group consisting of phenolic resins, hexamethoxymethylmelamine resins, and benzoguanidine resins each having a functionality (based on OH-reactive groups) of ≧2
   C) water,
   D) neutralizing agents and
   E) optionally solvents, auxiliaries and additives.

2. FDA-compliant aqueous coating compositions according to claim 1, wherein component a1) comprises one or more carboxylic acids and/or carboxylic acid derivatives selected from the group consisting of phthalic acid, isophthalic acid, terephthalic acid, trimellitic acid, succinic acid, maleic acid, adipic acid, sebacic acid, dimerized fatty acids and 1,4-cyclohexanedicarboxylic acid.

3. FDA-compliant aqueous coating compositions according to claim 1, wherein component a2) comprises one or more monocarboxylic acids selected from the group consisting of acetic acid, propionic acid, 1-octanoic acid, 1-decanoic acid, 1-dodecanoic acid, 1-octadecanoic acid, saturated and unsaturated fatty acids and benzoic acid.

4. FDA-compliant aqueous coating compositions according to claim 1, wherein component b1) comprises one or more polyols selected from the group consisting of ethylene glycol, diethylene glycol, triethylene glycol, 1,2 propanediol, neopentyl glycol, glycerol, trimethylolpropane, pentaerythritol and sorbitol.

5. FDA-compliant aqueous coating compositions according to claim 1, wherein component b2) comprises one or more monoalcohols selected from the group consisting of ethanol, 1-octanol, 1-decanol and 1-dodecanol.

6. A process for preparing FDA-compliant aqueous coating compositions according to claim 1, comprising mixing the individual components A)-E) with one another, wherein as a first step all of A), optionally in the presence of C), is fully or partly neutralized with D) before components B), E) and remaining amounts of C) and D) are added.

7. An FDA-compliant aqueous coating composition comprising the composition according to claim 1 and one or more components selected from the group consisting of defoamers, thickeners, flow-control agents, pigments, fillers, emulsifiers, dispersing assistants, light stabilizers, solvents and combinations thereof.

8. Coatings obtained from the FDA-compliant aqueous coating compositions according to claim 1.

9. Substrates coated with coatings according to claim 8.

10. Metal cans coated with coatings according to claim 8.

11. FDA-compliant aqueous coating compositions according to claim 2, wherein component a2) comprises one or more monocarboxylic acids selected from the group consisting of acetic acid, propionic acid, 1-octanoic acid, 1-decanoic acid, 1-dodecanoic acid, 1-octadecanoic acid, saturated and unsaturated fatty acids and benzoic acid.

12. FDA-compliant aqueous coating compositions according to claim 2, wherein component b1) comprises one or more polyols selected from the group consisting of ethylene glycol, diethylene glycol, triethylene glycol, 1,2 propanediol, neopentyl glycol, glycerol, trimethylolpropane, pentaerythritol and sorbitol.

13. FDA-compliant aqueous coating compositions according to claim 3, wherein component b1) comprises one or more polyols selected from the group consisting of ethylene glycol, diethylene glycol, triethylene glycol, 1,2 propanediol, neopentyl glycol, glycerol, trimethylolpropane, pentaerythritol and sorbitol.

14. FDA-compliant aqueous-coating compositions according to claim 11, wherein component b1) comprises one or more polyols selected from the group consisting of ethylene glycol, diethylene glycol, triethylene glycol, 1,2 propanediol, neopentyl glycol, glycerol, trimethylolpropane, pentaerythritol and sorbitol.

15. Coatings obtained from the FDA-compliant aqueous coating compositions according to claim 2.

16. Coatings obtained from the FDA-compliant aqueous coating compositions according to claim 3.

17. Coatings obtained from the FDA-compliant aqueous coating compositions according to claim 4.

18. Coatings obtained from the FDA-compliant aqueous coating compositions according to claim 5.

* * * * *